(No Model.)
D. Y. HALLOCK.
CONVERTIBLE POTATO DIGGER AND PLOW.
No. 588,826. Patented Aug. 24, 1897.
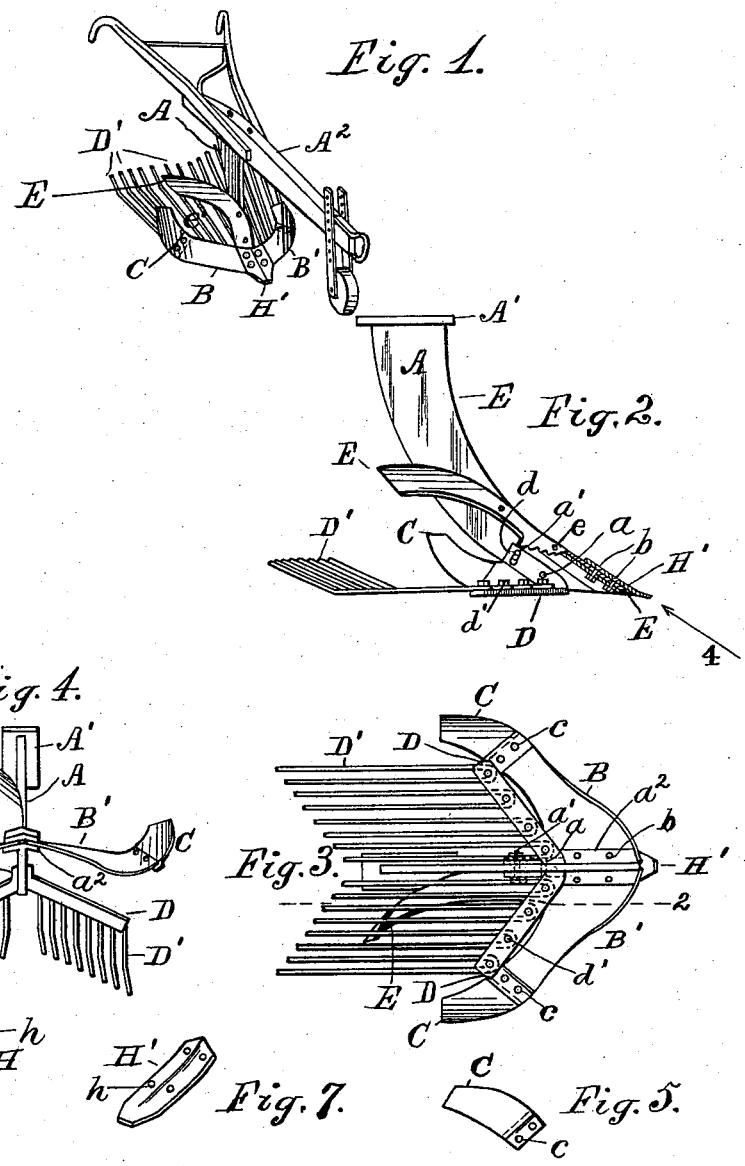
Attest:
L. Lee.
Edw. F. Kinsey
Inventor.
Daniel Y. Hallock, per
Thomas L. Crane, Atty.

UNITED STATES PATENT OFFICE.

DANIEL Y. HALLOCK, OF SOUTHOLD, NEW YORK.

CONVERTIBLE POTATO-DIGGER AND PLOW.

SPECIFICATION forming part of Letters Patent No. 588,826, dated August 24, 1897.

Application filed January 9, 1896. Serial No. 574,902. (No model.)

*To all whom it may concern:*

Be it known that I, DANIEL Y. HALLOCK, a citizen of the United States, residing at Southold, Suffolk county, New York, have invented certain new and useful Improvements in Convertible Potato-Diggers and Plows, fully described and represented in the following specification and the accompanying drawings, forming a part of the same.

The object of this invention is primarily to furnish an improved construction for a potato-digger by which the soil and tubers can be more effectively separated by working a part of the soil and tubers at the rear and part at the side or sides of the digger, and is an improvement on two patents granted to me—namely, No. 376,086, dated January 10, 1888, for improvement in potato-diggers, and No. 515,120, dated February 20, 1894, for improvement in potato-diggers.

This invention includes a standard, a shovel with rearwardly-curved and upwardly-extended scattering-tongue at its outer end or corner, sifting-rods in its rear, and a skeleton moldboard or device for lifting and conveying laterally the center and surface soil of the row and turning it bottom side up on the rearwardly-curved and upwardly-extended tongue or tongues of the shovel, where it is effectively scattered and separated, while part of the soil and tubers pass under the skeleton moldboard (which operates as a lifting and laterally-conveying device) upon the sifting-rods forming a screen in the rear of the shovel. In the drawings I have shown the lifting and laterally-conveying device as a skeleton moldboard on one side only of the standard, as one side is sufficient in practice for ordinary depth of planting, and when thus used the draft-clevis at the forward end of the beam may be so set as to draw the lower end of the moldboard centrally through the row of potatoes, thus lifting and conveying all the tubers and earth in the center of the row to one side. The skeleton moldboard may be duplicated, and by making the draft central the earth and tubers in the center of the row will be divided and conveyed to both sides.

This invention also includes a convertible potato-digger and plow of special construction. To facilitate the application of a skeleton moldboard to my shovel, I form the latter with parallel edges, so that when the lower edge rests upon the ground the upper edge is substantially horizontal, so that interchangeable moldboards of solid and skeleton form may be fitted to the top edge of the same for use, respectively, in a plow and potato-digger. With such a construction for the shovel it presents upon the front side a flat surface inclined upwardly and backwardly, and in order to throw a greater proportion of the earth from the surface of the shovel upon the screen in the rear of the same I provide the outer end of the shovel-blade with a rearwardly-curved and upwardly-extended tongue, which is preferably made detachable, so that when the implement is converted from a digger into a plow the said tongue may be readily removed. The fixtures for the convertible digger and plow therefore consist of the standard provided with such a shovel as I have described, having the detachable tongue at the outer end and interchangeable moldboards of solid and skeleton form fitted to the top of the shovel and a detachable screen to be secured behind the shovel when used as a digger, which would be replaced by a landside when the implement is used as a plow. To perform its function properly, the curved tongue at the end of the shovel is formed to present a surface continuous with the plane of the shovel, although curved upwardly in the manner described.

The invention also includes various details of construction, as will be hereinafter set forth and claimed.

In the annexed drawings, Figure 1 is a perspective view of the double-shovel digger. Fig. 1ª is a side elevation of the standard with plow-fixtures. Fig. 2 is a side view of the standard with the digger-fixtures, the shovel being cut away on line 2 2 in Fig. 3. Fig. 3 is a plan of the digger with double shovel inverted. Fig. 4 is an inclined view of the double-shovel digger viewed in the direction of the arrow 4 in Fig. 2. Fig. 5 is a perspective view of one of the detachable shovel-tongues. Fig. 6 is a perspective view of the plow-point for the single-shovel plow, and Fig. 7 a perspective view of the plow-point for the double-shovel plow.

The drawings show both a single and a double shovel implement, and A designates the standard, adapted at the lower end to receive a single shovel B upon one side or shovels B B' upon both sides.

A' designates the head of the standard, and A² the beam.

I will first describe the construction required for a single-shovel implement. The shovel B is narrow in width and of substantially uniform height, with its inner end or point attached to the side of the standard and its outer end provided with the tongue C, the surface of which extends continuously from the surface of the shovel B rearwardly and upwardly, as shown in Fig. 4, being detachably fastened to the outer end of the shovel by lapping under the end of the same, where it is secured by bolts. Where the foot of the tongue C is lapped under the end of the shovel, the foot of the tongue is offset, as shown in Figs. 4 and 5, so that the upper surface of the tongue and shovel may be flush or continuous. The bolts which pass through the shovel and the foot of the tongue would be made flush upon the upper side of the shovel, like the bolts used for securing a plow-point to the share. A screen is projected in the rear of the shovel, being formed of a flat bar or head-piece D, attached to the standard by arm $d$ and having fingers D' secured to the head-piece by bolts $d'$. The fingers are projected backwardly to run on the ground and their rear ends inclined upwardly, as shown in Figs. 1 and 3. The arm of the head-piece is secured by a pivot-bolt $a$ and a bolt inserted through a slot $a'$ at the outer end of the arm, the slot permitting the screen to pivot on the lower bolt, by which the suction or bite of the shovel may be adjusted.

The front edge of the standard is formed with a flange $a^2$ to attach the shovel and moldboard. A skeleton moldboard E and solid moldboard E' are fitted interchangeably to the standard by bolts $e$. The skeleton moldboard E consists, substantially, of a metallic strip extending upwardly along the front of the standard and then curved laterally and rearwardly, like the rear corner of the ordinary moldboard, so as to turn over the earth which is encountered by the same. Such construction leaves an opening $e'$ below the arched portion of such moldboard through which the earth passes over the shovel upon the screen-bars D'.

A point H (shown in Figs. 1ª and 6) is secured over the inner end of the shovel and the front edge of the standard to close the joint between the same and thus avoid careful and expensive fitting. The potato-digger with a single shovel comprises one shovel B, one tongue C, one screen, and one skeleton moldboard E, as shown in Fig. 2, and to constitute a double-shovel digger the parts are duplicated upon opposite sides of the standard, as shown in Figs. 1, 3, and 4, the two screens in such case being secured by the same bolts $a$ and $a'$, extended through the standard and the arm $d$, as shown in Fig. 3. An angle-shaped point H', adapted to cover the contiguous ends of the two shovel-blades, is used in such case.

The two points are made interchangeable by providing holes $h$ in suitable positions to fit the bolts $b$, which pass through the point, shovel-blades, and the standard. Thus all are locked together.

When operated as a digger, the shovel runs under the potato-row, loosening and lifting the soil and the tubers, part of which pass between the skeleton moldboard and the shovel to the screen, which is drawn solid on the ground to give a force of traction from the soil below to force the tubers and soil through and over the elevated ends of the screen as it is drawn forward, leaving the tubers on the surface, while the skeleton moldboard lifts and turns the balance of the row and the vines and trash laterally to be effectively scattered and sifted by the forward motion of the rearwardly and upwardly curved tongue C of the shovel.

The skeleton moldboard performs a different function from any spreading device heretofore used, as its arched shape, running continuously from the shovel upwardly and laterally, conveys the soil and vines from the center of the row easily to one side and turns the mass upside down upon the upwardly and rearwardly curved tongue of the shovel, while at the same time the opening $e$ permits the lower soil to pass without obstruction to the top of the screen.

The solid and skeleton moldboards are made interchangeable by forming the bolt-holes to fit the same bolts, and the construction thus furnishes the farmer with two important implements at little more than the expense of one.

The point H or H' is arranged to fit over the end of the shovel, which is secured to the flange $a^2$ upon the standard, and these parts are securely locked together by the same bolts $b$. This arrangement of the point and shovel-blades, especially when intended for a double-shovel plow or digger, greatly reduces the waste of material incident to making the shovel and point of sheet-steel in a single piece and provides for a cheap renewal of that part which is most exposed to wear. By putting the point H or H' upon the top of the shovel-blade it obviates the necessity of close-fitting joints, which would be required if the blade were fitted against the side of the point instead of running under the same. The bolts $b$ for securing these points pass through the shovel and increase its strength, and the point H' for the double shovel is made interchangeable with the shovel-point H by forming holes on each of its edges which are adapted to fit the same bolts upon one side as are used for securing the single point. By forming the inclined arm $d$ of the screen-head D with the bolting-slot $d'$ it provides not only a strong construction, but enables the screen to be adjusted in the required direction to incline the digger upward or downward, as may be required. When the implement is used as a plow with the solid moldboard E, a landside G is attached to the standard by bolts and projected backwardly in the usual manner, and the plow is thus adapted to perform every function. Although a number of parts are removed from the digger when converting it into a plow, only two additional parts are required to complete both implements—namely, the solid moldboard and the landside—and the additional expense required to furnish two complete implements is very slight.

I am aware that analogous constructions have been employed for converting a plow into a potato-digger, and I do not, therefore, claim such a construction, broadly.

In my construction I require the top of the shovel to extend horizontally that a convenient joint may be made between the same and the lower end of the skeleton moldboard, which, as I have stated before, extends continuously from the shovel upwardly and laterally, so that its lower end penetrates the soil and turns a mass of the same upside down upon the tongue C and screen behind the shovel. The tongue and the moldboard thus form when attached to the horizontal shovel continuous extensions of its surface, which are curved to perform the particular functions described.

The scattering-tongue, which I form upon the outer end of the shovel in my potato-digger, differs from any heretofore used in operating beneath the soil and in having an appreciable breadth transverse to the line of draft, so that it operates to sustain a considerable portion of the soil, which, as it slides up the rearwardly-inclined surface of the tongue, is very considerably loosened, and therefore scattered, before its discharge upon the screen or upon the ground outside of the potato-ridge. The lifting and scattering of the soil, which are effected by this rearwardly-inclined tongue, are a very material portion of the digging operation and serve to separate the potatoes from the soil in a very considerable degree. The breadth of the scattering-tongues, which enables them to perform this function, is very clearly shown at the rear ends of the tongues in Fig. 3, where it will be observed that they extend parallel for some distance to the line of draft, so that the earth may be retained upon the surface of the tongues as it slides backwardly, and is thus broken up and loosened before it is discharged. This construction of the tongue I have especially claimed in my first claim, as it adds materially to the efficiency of the digger.

Having thus set forth the nature of my invention, what I claim herein is—

1. A potato-digger comprising the standard A, the parallel-bladed shovel B attached at its inner end to the same and provided at the outer end with a tongue C having the offset foot secured detachably to the under side of the shovel with the upper surface of the tongue and shovel continuous, the tongue being curved rearwardly and upwardly as set forth, and having a considerable breadth transverse to the line of draft as herein shown and described, and projected rearwardly and upwardly in the line of draft and operated beneath the soil to lift and scatter the same, and the screen having head D provided with an arm $d$ inclined upwardly and rearwardly and formed with bolting-slot $a'$ and with hole for bolt $a$ for attaching it adjustably to the standard at the bottom line of the shovel, and the screen-bars D' drawn upon the ground to subject the material upon the screen to friction upon the under side, substantially as herein set forth.

2. A potato-digger, comprising the standard A, the parallel-bladed shovel B having its outer end provided with the tongue C forming a continuous extension of its surface curved rearwardly and upwardly, the screen projected backwardly from such shovel to receive the earth which passes over the same, and the skeleton moldboard E consisting of the strip extended upwardly along the front of the standard and then curved laterally and rearwardly, so that its lower end may penetrate the soil and lift and turn over the same upon the screen and tongue C, as and for the purpose set forth.

3. A convertible plow and potato-digger, comprising the standard A, with parallel-bladed shovel B attached at its inner end to the standard, the shovel B' fitted detachably thereto, the tongues C upon the outer ends of the shovel curved rearwardly and upwardly as set forth, the screens D, D' arranged to drag upon the ground behind the shovels, and having inclined arms $d$ fitted to opposite sides of the standard and secured by the two bolts $a$, the moldboard E fitted to the upper edge of the shovel and detachably to the standard, and the double plow-point H' adapted to fit over the contiguous ends of the shovels B, B', and secured by bolts passing down from the point H' and shovels B, B', and closing the joint between the shovels and the standard, the whole arranged and operated as set forth.

In testimony whereof I have hereunto set my hand in the presence of two subscribing witnesses.

DANIEL Y. HALLOCK.

Witnesses:
THOMAS S. CRANE,
EDW. F. KINSEY.